Aug. 6, 1963 W. HILLMER 3,100,121
JOINT LOCK RING FOR THIN WALLED CYLINDERS
Filed March 26, 1959
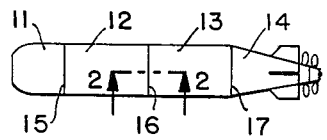
FIG. 1.
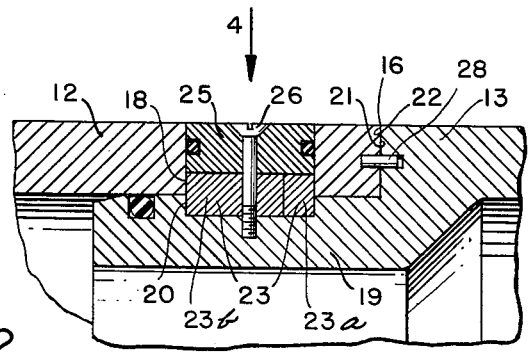
FIG. 3.
FIG. 2.
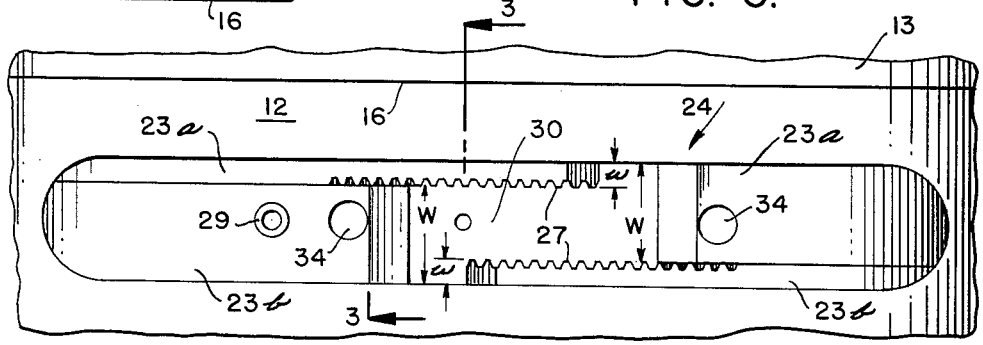
FIG. 4.
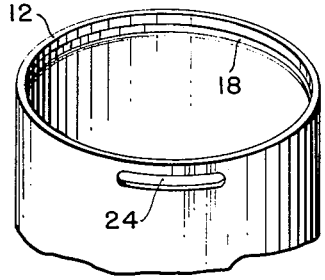
FIG. 5.
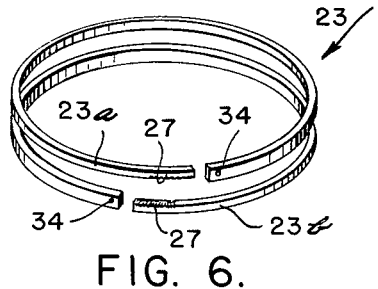
FIG. 6.
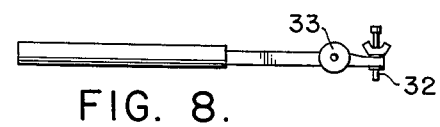
FIG. 8.
FIG. 9.
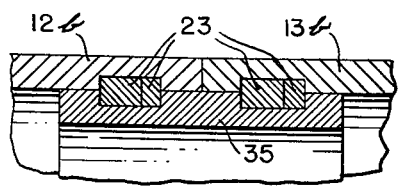
FIG. 7.
FIG. 10.
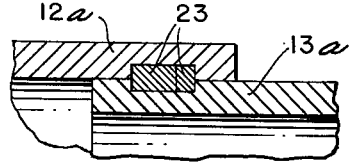
INVENTOR.
WILLY HILLMER
BY
V.C. Muller
ATTORNEYS.

United States Patent Office 3,100,121
Patented Aug. 6, 1963

3,100,121
JOINT LOCK RING FOR THIN WALLED CYLINDERS
Willy Hillmer, 405 Alpine St., Pasadena, Calif.
Filed Mar. 26, 1959, Ser. No. 802,272
7 Claims. (Cl. 285—321)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in joint devices for locking adjacent tubular members together, such as adjacent hull sections of torpedoes.

In torpedoes it is common practice to form the torpedo hull in sections, which are secured together by various devices such as circumferentially spaced bolts, channel shaped clamping bands, bayonet connections, etc. Such devices have disadvantages in that they are complicated, bulky, difficult to construct and assemble and do not provide optimum streamlining of the exterior surface of the shell. Many of these disadvantages have been obviated by a construction as disclosed in the patent application of Frederic N. Eaton, Serial No. 382,489, filed September 25, 1953, now Patent No. 2,877,732, which provides a highly effective and streamlined joint. In the construction disclosed in the application referred to a split locking ring, which may be either of the expansible or contractible type, is disposed between confronting mating grooves in a pair of adjacent shell sections when in locked position and may be expanded or contracted to lie in only one of the sections to permit the telescoping movement of the sections during assembly or disassembly. Its construction therefore requires a groove in one of the sections of sufficient radial depth to receive the ring. In order to maintain desired strength across the joint for the stresses to which it is subjected, sufficient wall material must also remain which thus thickens the entire joint at the telescopic portion of same which reduces the inside available diameter, a disadvantage where space is at a premium, as in a torpedo.

The principal object of this invention is to provide an improved joint device of the general type just referred to which eliminates radial clearance space for a lock ring.

Another object is to provide a lock ring for adjacent cylindrical telescopic hollow members which substantially fills confronting mating grooves and effects minimized overall thickness at the telescopic joint.

Further objects, advantages, and salient features will become more apparent from the description to follow, the appended claims and the accompanying drawing in which:

FIG. 1 is a side elevation of a torpedo;
FIG. 2 is an enlarged section taken on line 2—2, FIG. 1;
FIG. 3 is an enlarged section of detail 3 of FIG. 2 and a section taken on line 3—3, FIG. 4;
FIG. 4 is a side elevation of FIG. 3, as viewed in the direction of arrow 4, a cover plate being removed;
FIG. 5 is a perspective of a portion of one of the hull sections;
FIG. 6 is an exploded perspective of a two part locking ring;
FIG. 7 is a perspective of a wrench employed to tighten or loosen the two part locking ring;
FIG. 8 is a side elevation of a tool which may be employed to remove the two part ring during disassembly of parts; and
FIGS. 9 and 10 are sections like FIG. 3 showing modifications.

Referring in detail to the drawing, FIG. 1 depicts a self propelled underwater torpedo having several sections, such as nose section 11, intermediate sections 12, 13 and tail cone section 14 secured together at joints 15, 16, 17. FIG. 2 illustrates any pair of adjacent section which, for convenience, may be considered as sections 12, 13 which form joint 16, it being understood that joints 15, 17 may be of like construction. Section 12, as shown in FIG. 3 is a cylindrical tube having an inwardly facing rectangular circumferential groove 18 disposed in spaced relation to joint 16 and section 13 is provided with a similar cylindrical end 19 which telescopes into the bore of section 12 and is provided with an outwardly facing groove 20 which is aligned with groove 18 when the two sections are disposed in telescopic relation with end face 21 of section 12 in abutting relation with face 22 on section 13. The radial depths of the two grooves are preferably substantially equal and receive a two part split ring 23 which fill the two grooves throughout the periphery of same except at a portion of an access opening to now be described.

Referring to FIG. 5, section 12 is provided with a slot 24 which extends through the wall of the section in aligned relation with groove 18 which provides an access zone for inserting or removing the two part ring. After the two sections are assembled an arcuate plate 25 is inserted in the slot and secured to section 12 by one or more screws 26. Any suitable sealing means, such as an O-ring extending around the radial faces of the plate may be employed to prevent water leakage into the grooves and similarly, any suitable sealing means such as an O-ring may be employed between sections 12, 13 to prevent water leakage into the inside of the sections.

The two part ring 23 is best shown in its entirety in FIG. 6 and comprises two identical parts 23a, 23b which are rolled or otherwise formed to circular shape to conform to the circular shape of the mating grooves. Each part, as best shown in FIG. 4, tapers in width from a width W at one end to a smaller width w at its other end, the sum of the widths at all points about the periphery being the same and thus producing a rectangular cross section of constant thickness equal to the combined radial depths of both grooves but of variable width depending upon the angular relationship of the two parts. The end of each part is provided with gear teeth 27, the purpose of which will be hereinafter set forth.

In the assembly of the sections, sections 12 and 13 are telescoped together to the position shown in FIG. 3. Since no relative rotation of the sections is necessary they may be disposed in any desired angular relationship fixed by one or more dowel pins 28. Plate 25 is removed from slot 24 at this time and one of the ring parts, such as part 23b is threaded into slot 24 and the mating grooves, its narrow end being the leading or inserting end. It may then be pinned to member 12 by a pin 29 extending into aligned apertures. Part 23a is then similarly threaded into position but with an opposite direction of rotation until the gear teeth on its end are disposed in access space 30. A wrench 31 having mating gear teeth is then inserted into access space 30, engaging the teeth on the narrow ends of both ring parts. Rotation of the wrench then rotates part 23a within the grooves thus increasing the total width of the two ring parts until they are limited by the groove widths. The grooves are now filled in the direction of their widths, faces 21, 22 are in abutting relation and the two part ring prevents any relative longitudinal movement between the sections. Plate 25 may then be inserted and secured in slot 24.

To remove the two ring parts the operation is reversed from that just described. Wrench 31 is again inserted and rotated in the opposite direction rotating ring part 23a and thus loosening the wedging locking action in the grooves. A tool as shown in FIG. 8, having a screw 32 at one end and a pair of spaced rollers 33 which straddle slot 24 is disposed adjacent slot 24, with plate 25 removed, and screw 32 is rotated to engage a threaded aperture 34 in part 23a. Rotation of the tool about the axis of rollers 33 lifts the wide end of part 23a through and above the slot as the tool is pulled. As will be apparent, part 23b is similarly removed after removal of pin 29.

In the construction so far described members 12, 13 are the same outside diameter at joint 16 since in the application of the invention to a torpedo hull it is desirable to provide a smooth outer hull surface which will obviate water drag across the joint. When this feature is of no importance such as in general applications of securing a pair of tubular members together a construction may be employed as shown in FIG. 9 where tube 13a has an outer diameter equal to the bore of tube 12a. As will be apparent, the two part ring may be employed in the same manner previously described. If it is desired to secure together tubes of the same inside and outside diameter a construction as shown in FIG. 10 may be employed wherein adjacent ends of tubes 12b, 13b are telescoped over a joint ring 35 having an outside diameter equal to the bores of both tubes. In this application two two-part rings may be employed, each adapted to secure one of tubes 12b, 13b to the joint ring 35 disposed with the tubes.

Obviously many modifications and variations of the present invention are possible in the light of the above teachings. It is therefore to be understood that within the scope of the appended claims the invention may be practiced otherwise than as specifically described.

What is claimed is:

1. In a pair of axially aligned cylindrical tubular members adapted to be removably secured together, one of said members having a male end portion adapted to telescope within a female end portion of the other member, the improvements, comprising; an outwardly facing rectangular circumferential groove in said male portion, a like inwardly facing groove in said female portion adapted to be aligned with the first named groove, an access slot in said female portion extending radially outward from the groove in same to the outside surface of same, and circumferentially a flexible split lock ring adapted to be inserted through the access slot and thence circumferentially into the mating grooves, said lock ring comprising two identical parts, each part having a width at one end thereof less than the width of said grooves and tapering uniformly in width to a lesser width at its other end, the two parts, when disposed adjacent each other being rectangular in cross section and substantially filling said grooves and being relatively movable circumferentially, relative movement of the parts effective to increase the width of the two parts and expand same in the longitudinal direction of said cylindrical members to tightly wedge the ring in the grooves and prevent longitudinal relative movement of the cylindrical members.

2. Apparatus in accordance with claim 1 wherein the male end portion of one of said members forms an integral part thereof.

3. Apparatus in accordance with claim 1 wherein the male end portion of one of said members comprises a sleeve affixed within the bore of same.

4. Apparatus in accordance with claim 1 wherein the male end portion of one of said members is substantially the same outer diameter as the remaining portion thereof.

5. Apparatus in accordance with claim 1 wherein said tubular members are adjacent sections of a torpedo hull.

6. In a pair of axially aligned cylindrical tubular members adapted to be removably secured together, one of said members having a male end portion adapted to telescope within a female end portion of the other member, the improvements, comprising; an outwardly facing rectangular circumferential groove in said male portion, a like inwardly facing groove in said female portion adapted to be aligned with the first named groove, an access slot in said female portion extending radially outward from the groove in same to the outside surface of same, and a split lock ring adapted to be inserted through the access slot and thence circumferentially into the mating grooves, said lock ring comprising two parts adapted to be rotated relatively in a circumferential direction for varying the combined width of same in a direction longitudinally of the tubular members.

7. In a pair of axially aligned cylindrical tubular members adapted to be removably secured together, one of said members having a male end portion adapted to telescope within a female end portion of the other member, the improvements, comprising; an outwardly facing rectangular circumferential groove in said male portion, a like inwardly facing groove in said female portion adapted to be aligned with the first named groove, and a split lock ring disposed in the mating grooves, said lock ring comprising two parts adapted to be rotated relatively in a circumferential direction for varying the combined width of same in a direction longitudinally of the tubular members.

References Cited in the file of this patent

UNITED STATES PATENTS

| | | |
|---|---|---|
| 477,695 | Osgood | June 28, 1892 |
| 738,503 | Waters | Sept. 8, 1903 |
| 977,472 | Pilkington | Dec. 6, 1910 |
| 981,705 | Spencer | Jan. 17, 1911 |
| 1,282,959 | Sears | Oct. 29, 1918 |
| 1,902,697 | Ellingsen | Mar. 21, 1933 |
| 2,108,265 | Martin | Feb. 15, 1938 |
| 2,405,889 | Kennedy | Aug. 13, 1946 |
| 2,886,382 | Baublys | May 12, 1959 |

FOREIGN PATENTS

| | | |
|---|---|---|
| 884,087 | Germany | July 23, 1953 |